(12) United States Patent
Peacock et al.

(10) Patent No.: US 10,091,109 B2
(45) Date of Patent: *Oct. 2, 2018

(54) SYSTEMS AND METHODS FOR CENTRALLY-ASSISTED DISTRIBUTED HASH TABLE

(71) Applicant: Vivint, Inc., Provo, UT (US)

(72) Inventors: Alen Lynn Peacock, Orem, UT (US); John Timothy Olds, Sandy, UT (US); Jeffrey Michael Wendling, West Jordan, UT (US); Erik Sean Nolte, Salt Lake City, UT (US)

(73) Assignee: Vivint, Inc., Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/469,881

(22) Filed: Mar. 27, 2017

(65) Prior Publication Data

US 2017/0264544 A1 Sep. 14, 2017

Related U.S. Application Data

(63) Continuation of application No. 14/500,825, filed on Sep. 29, 2014, now Pat. No. 9,608,907.

(51) Int. Cl.
*G06F 15/173* (2006.01)
*H04L 12/743* (2013.01)
(Continued)

(52) U.S. Cl.
CPC .... *H04L 45/7453* (2013.01); *G06F 17/30097* (2013.01); *H04L 67/1097* (2013.01)

(58) Field of Classification Search
CPC ............ H04L 45/7453; H04L 67/1097; G06F 17/30097
See application file for complete search history.

(56) References Cited

U.S. PATENT DOCUMENTS 7,562,149 B2 7/2009 Teodosiu et al.
7,643,459 B2 1/2010 Miller et al.
(Continued)

FOREIGN PATENT DOCUMENTS

KR 1020090016692 A 2/2009

OTHER PUBLICATIONS

PCT International Search Report for International Application No. PCT/US2015/048030, dated Dec. 11, 2015 (3 pp.).
(Continued)

*Primary Examiner* — Cheikh Ndiaye
(74) *Attorney, Agent, or Firm* — Holland & Hart LLP

(57) ABSTRACT

Methods and systems are described managing module for locating a target storage device among a plurality of storage devices connected via a network. A computer implemented method includes sending registration information to a central directory, wherein the registration information includes at least an address of one of the plurality of storage devices, and the central directory stores the registration information in a registry. The method also includes sending a request to the central directory for an address for another one of the plurality of storage devices, receiving the address from the central directory if the address is in the registry, and conducting a successive lookup of a closest known address until the address is located if the address is not in the registry.

13 Claims, 10 Drawing Sheets

(51) Int. Cl.
  *G06F 17/30* (2006.01)
  *H04L 29/08* (2006.01)

(56) References Cited

U.S. PATENT DOCUMENTS

| | | |
|---|---|---|
| 8,572,237 B2 | 10/2013 | Ginkel et al. |
| 2002/0147611 A1* | 10/2002 | Greene .......... G06Q 10/063112 705/1.1 |
| 2007/0033167 A1* | 2/2007 | Basu ................ G06F 17/30864 |
| 2007/0250700 A1 | 10/2007 | Sidhu et al. |
| 2007/0258389 A1 | 11/2007 | Suzuki et al. |
| 2008/0052298 A1 | 2/2008 | Yeh |
| 2008/0098121 A1 | 4/2008 | Wu |
| 2008/0130516 A1 | 6/2008 | You et al. |
| 2008/0319956 A1 | 12/2008 | Ushiyama |
| 2009/0119386 A1 | 5/2009 | Busser et al. |
| 2009/0201834 A1 | 8/2009 | Xu |
| 2009/0234918 A1* | 9/2009 | Neumann ............... H04W 4/02 709/204 |
| 2009/0247207 A1 | 10/2009 | Lor |
| 2010/0161817 A1 | 6/2010 | Xiao et al. |
| 2011/0205949 A1 | 8/2011 | Mäaenpää et al. |
| 2013/0024515 A1 | 1/2013 | Parker |
| 2014/0289862 A1 | 9/2014 | Gorfein et al. |

OTHER PUBLICATIONS

Extended European Search Report for EP Application No. 15846227.5, dated Apr. 24, 2018 (8 pp.).

* cited by examiner

SYSTEMS AND METHODS FOR CENTRALLY-ASSISTED DISTRIBUTED HASH TABLE

CROSS-REFERENCE TO RELATED APPLICATIONS

The present application is a continuation of U.S. patent application Ser. No. 14/500,825, titled: "Systems and Methods for Centrally-Assisted Distributed Hash Table," filed on Sep. 29, 2014. The disclosure of which is incorporated by reference herein in its entirety.

BACKGROUND

Advancements in media delivery systems and media-related technologies continue to increase at a rapid pace. Increasing demand for media has influenced the advances made to media-related technologies. Computer systems have increasingly become an integral part of the media-related technologies. Computer systems may be used to carry out several media-related functions. The wide-spread access to media has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the wide-spread use of computers has come an increased presence of in-home computing capability. As the prevalence and complexity of home computing systems and devices expand to encompass other systems and functionality in the home, opportunities exist for improved communication between devices distributed across many homes, such as devices in peer-to-peer networks.

SUMMARY

Methods and systems are described for locating a target storage device among a plurality of storage devices connected via a network. An example hybrid distributed hash table (DHT) system in accordance with the present disclosure includes a network, a plurality of storage devices, and a central directory in communication with the plurality of storage devices via the network. The central directory is configured to receive registration information separately from each of the plurality of storage devices and maintain a registry of the plurality of storage devices. A lookup function performed by at least one of the plurality of storage devices includes checking the central directory for an address of one of the plurality of storage devices, and conducting a successive lookup for closest known addresses until the address is located if the central directory does not respond with the address within a predetermined time period.

In one example, the successive lookup includes a O(log n) lookup logic. The successive lookup may be initiated if the central directory responds that the address is not in the registry, or does not respond within the predetermined time period. The plurality of storage devices may send registration information to the central directory automatically on a periodic basis. The successive lookup may be initiated before checking the central directory, may be terminated if the central directory responds with the address, and may continue if the central directory does not respond with the address of the target storage device. The lookup function may include a key value search, and the address may be one of a plurality of keys searchable in the key value search. A unique node identifier and/or a physical address may be additional keys of the plurality of keys searchable in the key value search. At least one of the plurality of storage devices may be configured to communicate with another of the plurality of storage devices using the address.

Another embodiment is directed to a computer implemented method for locating a target storage device among a plurality of storage devices connected via a network. The method includes sending registration information to a central directory, wherein the registration information includes at least an address of one of the plurality of storage devices, and the central directory stores the registration information in a registry. The method also includes sending a request to the central directory for an address for another one of the plurality of storage devices, receiving the address from the central directory if the address is in the registry, and conducting a successive lookup of a closest known address until the address is located if the address is not in the registry.

In one example, the method further includes initiating the successive lookup before checking the central directory, and terminating the successive lookup if the central directory responds with the address. The method may include communicating with another one of the plurality of storage devices using the address. The method may include delivering data to another one of the plurality of storage devices using the address, wherein the data is stored at the another one of the plurality of storage devices. The method may include receiving lease terms from the central directory, and sending registration information to the central directory according to the lease terms. The method may include sending registration information to the central directory each time the one of the plurality of storage devices is connected to the network after having been disconnected from the network. The method may include periodically communicating with the central directory to confirm presence of the one of the plurality of storage devices in the network.

A further embodiment relates to an apparatus for locating a target storage device among a plurality of storage devices connected via a network. The apparatus includes a processor, a memory in electronic communication with the processor, and instructions stored in the memory. The instructions are executable by the processor to initiate a successive lookup of a closest known address for one of the plurality of storage devices, send a request to a central directory for an address for the one of the plurality of storage devices, wherein the central directory includes addresses for each of the plurality of storage devices. The instructions are executable by the processor to receive the address from the central directory and terminate the successive lookup if the address is in the central directory. If the address is not in the central directory, the instructions are executable by the processor to continue the successive lookup until the address is located.

In one example, the instructions may be executable by the processor to deliver data to the one of the plurality of storage devices using the address, wherein the data is stored at the one of the plurality of storage devices.

A further embodiment is directed to a computer implemented method for locating a target storage device address among a plurality of storage devices in a network. The method includes receiving registration information from each of the plurality of storage devices, the registration information including at least an address, generate a registry of the received registration information, receiving a request for an address for one of the plurality of storage devices from another of the plurality of storage devices, delivering the address if the address is in the registry, and generating a notice that the address is not available if the address is not in the registry.

In one example, the method may include receiving registration information from the plurality of storage devices upon the plurality of storage devices being added to or taken away from the network. The method may include delivering lease information to each of the plurality of storage devices in response to receiving the registration information.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1:
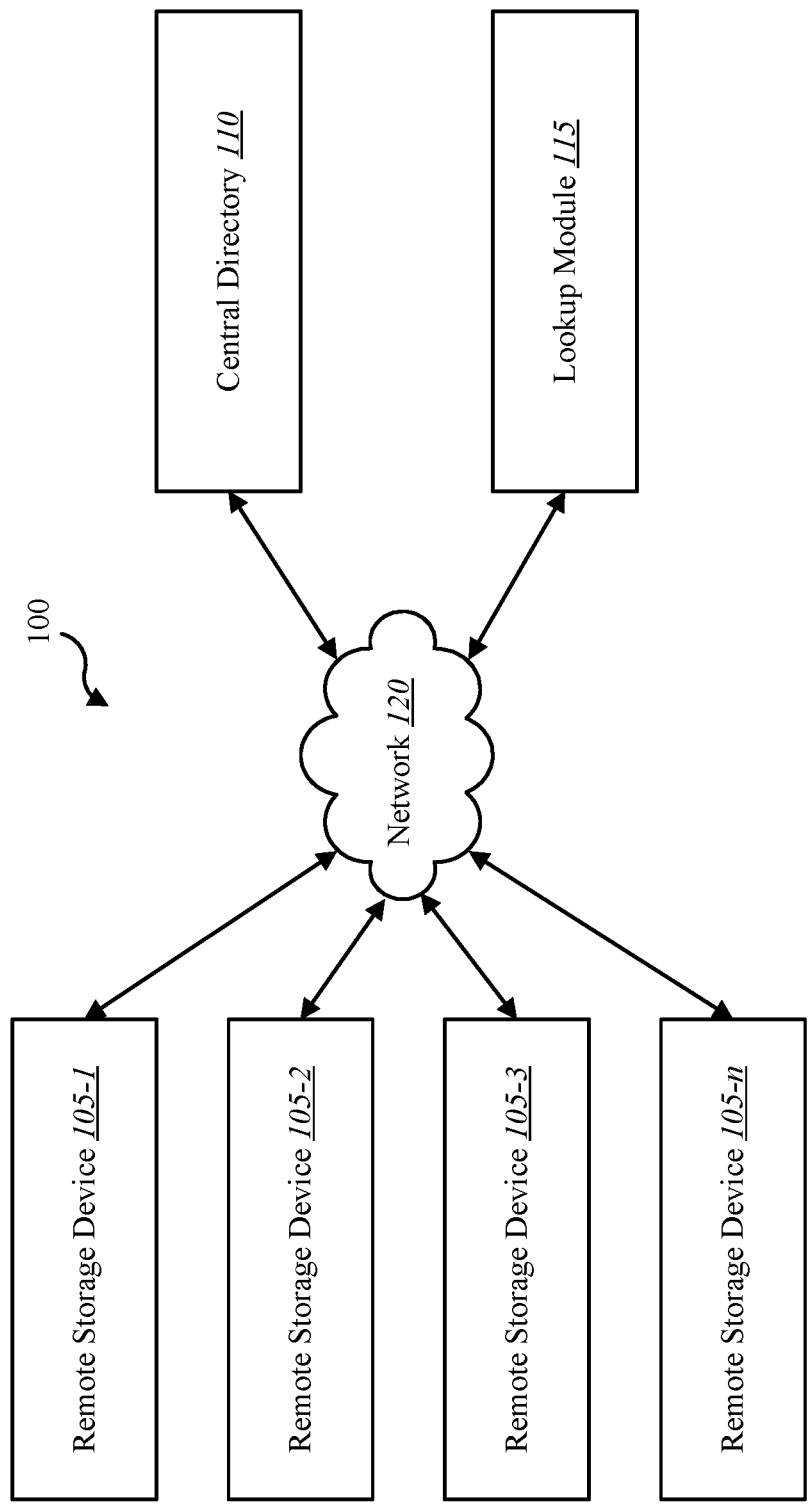
FIG. 1 is a block diagram of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The systems and methods described herein generally relate to use of Distributed Hash Tables (DHTs) in a peer-to-peer network of data storage devices. DHTs provide a way for "internet scale" (hundreds of thousands or millions of participants) networks a way to look up and communicate with each other without the burden of every node needing to receive lookup information updates every time any other node comes online, goes offline, or changes addresses, and/or every node needing to keep a full copy of the lookup addresses in memory or on disk locally. DHTs accomplish these outcomes by making each node focus on a local neighborhood of addresses, with rapidly decreasing knowledge of other address neighborhoods the further away those participants are from the source node, using metrics as a measure of distance between nodes and neighborhoods. Nodes then rely on asking other nodes in other neighborhoods for more local information about those neighborhoods on demand, and using that information in an iterative or recursive fashion to gather the information they need about routing only when that information is needed. In most cases, this means that nodes need to perform O(log n) operations (i.e. logarithmic searching) whenever looking up an address of another node, where 'n' grows larger as the network size increases. However, since lookup operations are typically performed on virtually every 'store' or 'retrieve' operation, the use of typical DHTs and associated O(log n) operations can place a significant burden on the network and limit network performance.

One aspect of the present disclosure relates to a hybrid type DHT in which information about the various nodes (e.g., personal storage devices) are stored at a centralized location in the network. The DHT is modified so that all DHT participants are required to register their lookup/contact information centrally with a central directory and/or central directory service. The central directory service therefore knows the lookup/contact information for all nodes in the network. The central directory service maintains a full registry of all nodes and how they can be contacted directly. The central directory service is made aware of updates when nodes change state by, for example, coming online, going offline, changing address, changing method of contact, etc.

An example method in accordance with the present disclosure includes, during a normal lookup operation, using successive (iterative or recursive, parallel or serial) lookups (e.g., O(log n) lookup) to the closest known address until no more known closer addresses are returned is implemented as is standard in DHT systems. At the start of the successive lookup function, a shortcut may be added to query the central directory service for the address. If the query returns a result, the lookup function can short circuit the O(log n) lookup logic and contact the target node directly without further operations. If the central directory service does not return a result, the normal successive lookup process is continued as if the short circuit logic was not there in the first place. If the central directory service is slow to respond (perhaps due to load on the central service, outage, maintenance, or other issue), the DHT participant continues on the normal successive lookup code path as if the short circuit logic was not there in the first place.

This hybrid approach may provide advantages such as allowing the system to reduce operations, increase responsiveness, and speed up normal DHT operations that depend on lookup without burdening the individual participants with large routing tables or a constant stream of routing table updates. The hybrid solution may also permit the system to work relatively normally (although in a comparatively degraded performance state) when the central directory service is unavailable or slow. This hybrid approach may also provide an automatic mechanism for participants to reduce load on the central service when the system is overloaded.

In addition to the above, the present systems and method may include unique participant registration. In at least some examples, participants register with the central server on startup, and then keep that registration alive by periodically pinging the central server (e.g., central directory service). Typically, the registration messages (e.g., pings) include contact information for that participant. The central server returns a lease and/or information about the lease to the participant indicating at least a term for the registration. The registrant uses the lease term to establish a time window for future updates. When leases expire on the central server, the lease information may be automatically expunged. This allows the central server's information to always be up to date, within the time window of the leases given.

FIG. 1 is a block diagram illustrating one embodiment of environment 100 in which the present systems and methods may be implemented. In at least some embodiments, environment 100 includes a plurality of remote storage devices 105, a central directory 110, a lookup module 115, and a network 120. The network 120 facilitates communication between the remote storage devices 105 and between the remote storage devices 105, the central directory 110, and the lookup module 115. Although lookup module 115 is shown as a separate component from the remote storage devices 105 and central directory 110, other embodiments, such as those described below with reference to FIGS. 2-4, may include the lookup module 115 as part of at least one of the remote storage devices 105 and central directory 110.

Generally, each of remote storage devices 105 are identified in a distributed hash table, using, for example, a key value system. In at least one example, the key is an identifier for each of the remote storage devices 105, and the value is an address for each of the remote storage devices 105. Other types of keys and values may be used with environment 100. Typically, all participants in the distributed hash table will converge on the same key when they are doing a lookup because a value has been stored in association with that key at some point previously. This arrangement permits, for example, file sharing where there is a common identifier that every participant can look up in order to find the particular file in the case where the key is a file rather than a remote storage device and the value is an address for that file.

In a non-distributed system in which data is stored centrally in one location, a simple database with keys and values may be used, and simply asking the database what the value is for a particular key leads to the desired information. In a distributed system, such as the one in which the present hybrid distributed hash table is applied, the keys are distributed throughout multiple participants (e.g., remote storage devices 105). As such, a particular system is needed in order to find what device or devices should be accessed in order to obtain a key because different remote storage devices 105 will be storing different keys or portions of a key. Distributed hash tables, such as those employed according to the present disclosure, provide solutions for key value lookups in a distributed system that includes a plurality of remote storage devices 105.

It is typical for a distributed hash table to have lookup times for keys that grow logarithmically with the size of the network. Each time additional devices are added to the network, an additional lookup operation is added. However, as a system grows from thousands to hundreds of thousands or millions, lookup times may increase significantly in order to find keys in the system. Additionally, even without a scaling issue, looking up keys in a distributed hash table may take several rounds of lookup efforts to various participants (e.g., remote storage devices 105) in the network in order to find those keys to make sure that the lookup process is converging on the right devices in order to obtain the desired keys and/or values.

The central directory 110 provides somewhat of a shortcut in this lookup procedure in a distributed network including a plurality of remote storage devices 105. The central directory 110 may maintain a central database of the keys and values such as the locations of all of the participants (e.g., remote storage devices 105) in the network. A participant may reference central directory 110 as a shortcut to the otherwise logarithmic lookup operation, which may result in the central directory 110 providing the value (e.g., address for one of the remote storage devices 105 or other nodes) in one operation as opposed to taking multiple steps in order to find the address for a given node.

Lookup module 115 may provide a mechanism by which the lookup in central directory 110 occurs. Lookup module 115 may provide a communication between remote storage devices 105 and central directory 110. In one example, when a remote storage devices 105 would like to communicate with one of the other remote storage devices 105 that does not have an address for that particular remote storage devices 105. An inquiry may be directed to central directory 110 via lookup module 115 for the desired address for a particular remote storage device 105. Lookup module 115 may obtain the address (e.g., value) from central directory 110 and deliver the address to the remote storage device 105. The remote storage device may then use the address to communicate with another one of remote storage devices 105. The communication may include, for example, delivering data for storage in the other remote storage device 105, such as providing a backup copy of one or more data blocks stored previously on remote storage device 105.

Lookup module 115 may also facilitate concurrent lookups via a logarithmic lookup logic (e.g., an O (log n) lookup) for the desired address as well as contacting central directory 110 for the address. The address may represent a target one of the remote storage devices 105 and/or information/data stored on one or more of the remote storage devices 105. In the event that central directory 110 does not have the address or does not respond within a predetermined time period, lookup module 115 may continue the logarithmic lookup logic for a closest known address until, for example, no more known closer addresses are returned. If at any point the central directory 110 provides the address, the logarithmic lookup logic may be terminated. Concurrently employing both searches (e.g., via the logarithmic lookup logic and querying central directory 110) may provide a more efficient and optimized use of time for obtaining the desired address to account for circumstances in which central directory 110 does not include the desired address or is slow in responding to a query (e.g., due to high traffic, hardware defects, or the like).

Another aspect of environment 100 relates to registration of remote storage devices 105 with central directory 110. All participants in the distributed hash table (e.g., each of remote storage devices 105) may register with central directory 110 when brought online into use in the network. Similarly, remote storage devices 105 may provide notice when being removed from the network (e.g., brought down for maintenance or the user is moving to a new geographic location) by communicating such status updates with central directory 110. Lookup module 115 may assist in the registry and status update processes.

In at least some examples, as described in further detail below, the registration process may include central directory 110 generating and/or communicating a lease and/or information concerning a lease with remote storage device 105. The lease may include, among other things, a lease term. Lease information may be communicated from lookup module 115 to remote storage devices 105. Remote storage devices 105 may use the lease information (e.g., lease term) to calendar a future communication with central directory 110 to renew the lease. Renewing the lease may include sending a communication from remote storage device 105 to central directory 110. The communication may request, for example, an updated lease, a change in status related to particular terms of the lease, or the like. Other types of communications may be possible between remote storage device 105 and central directory 110 (e.g., via lookup module 115) including, for example, periodic pings to confirm that remote storage device 105 is still present and active/operable, and/or that communications are possible between remote storage device 105 and central directory 110.

While key value databases may be particularly useful for the application to distribute hash tables, other types of databases may also be possible. For example, current relationship databases may be used to provide additional detail beyond what is possible with a simple key value database. In other examples, multiple key value databases may be implemented concurrently in environment 100. For example, one key value database may relate to the identity and address of each of the plurality of remote storage devices 105. A separate key value database may relate to stored data, such as data files and their associated address on one of the remote storage devices 105. A still further key value database may relate to the physical location as opposed to an IP address for the remote storage devices 105.

One application of the hybrid distributed hash tables disclosed herein may be for a home automation and security system (also referred to herein as a home automation system). Remote storage device 105 may be part of the home automation system. In some examples, remote storage devices 105 may be used to store data associated with one or more home automation systems, wherein each home automation system is associated with a particular home, business, property, or the like. Remote storage device 105 may be included in or comprise a control panel of the home automation system. Central directory 110 may be housed or operable by a backend server, such as a central server, central station, backend support system, or the like, for the home automation system.

Network 120 may utilize any available communication technology such as, for example, Bluetooth, Zigby, Z-wave, infrared (IR), radio frequency (RF), near field communication (NFC), or other short distance communication technologies. In other examples, network 120 may include cloud networks, local area networks (LAN), wide area networks (WAN), virtual private networks (VPN), wireless networks (using 802.11 for example), and/or cellular networks (e.g., using 3G and/or LTE), etc. In some embodiments, network 120 may include the internet.

Figure 2:
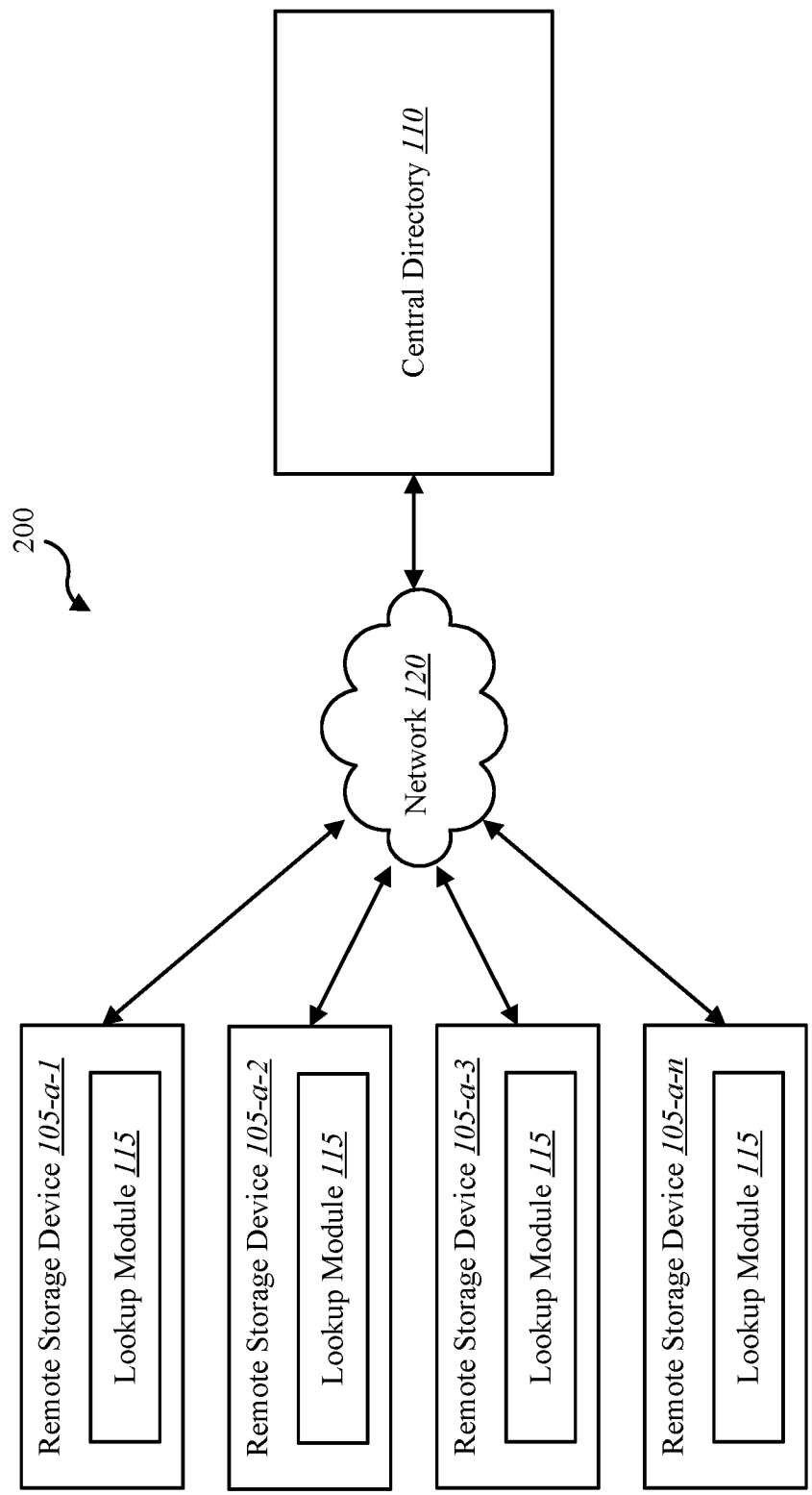
FIG. 2 is a block diagram of another environment in which the present systems and methods may be implemented.

FIG. 2 is a block diagram illustrating one example of an embodiment 200 in which the present systems may be implemented. Environment 200 may include at least some of the components of environment 100 described above. Environment 200 may include a plurality of remote storage devices 105-*a* each having a lookup module 115 or a component thereof. Environment 200 may also include central directory 110 and network 120 that provide communication between remote storage devices 105-*a*, and between remote storage devices 105-*a* and central directory 110.

Lookup module 115, or at least portions thereof, may operate on each of remote storage devices 105-*a* to search for other of the remote storage devices 105-*a* and/or data stored on any one of the remote storage devices 105-*a*. Part of the search provided via lookup module 115 may include a logarithmic search for closest known addresses and/or other values until no more known closer addresses and/or values are returned. Additionally, or alternatively, lookup module 115 may conduct a search by reference to central directory 110. Central directory 110 may include the address and/or value for which remote storage device 105-*a* is searching. Lookup module 115 may operate to conduct the logarithmic search and query the central directory 110 concurrently. Any logarithmic search may be terminated if central directory 110 produces the requested address and/or value. The logarithmic search may continue while waiting for a response from central directory 110, and may be terminated upon receiving a response from central directory 110 with the requested address and/or value at any point up until the logarithmic search is completed.

Lookup module 115 may provide communication between a remote storage devices 105-*a* as well as providing communication between any of the remote storage devices 105-*a* and central directory 110. In other arrangements, a single lookup module 115 may be dedicated to one or more of the remote storage devices 105-*a* and less than all of the remote storage devices 105-*a*. Typically, remote storage devices 105-*a* are distributed geographically and remotely from each other and remotely from central directory 110. In at least some examples, a separate remote storage device 105-*a* is associated with a single user so that a ratio of users to remote storage devices 105-*a* is approximately 1.

Figure 3:
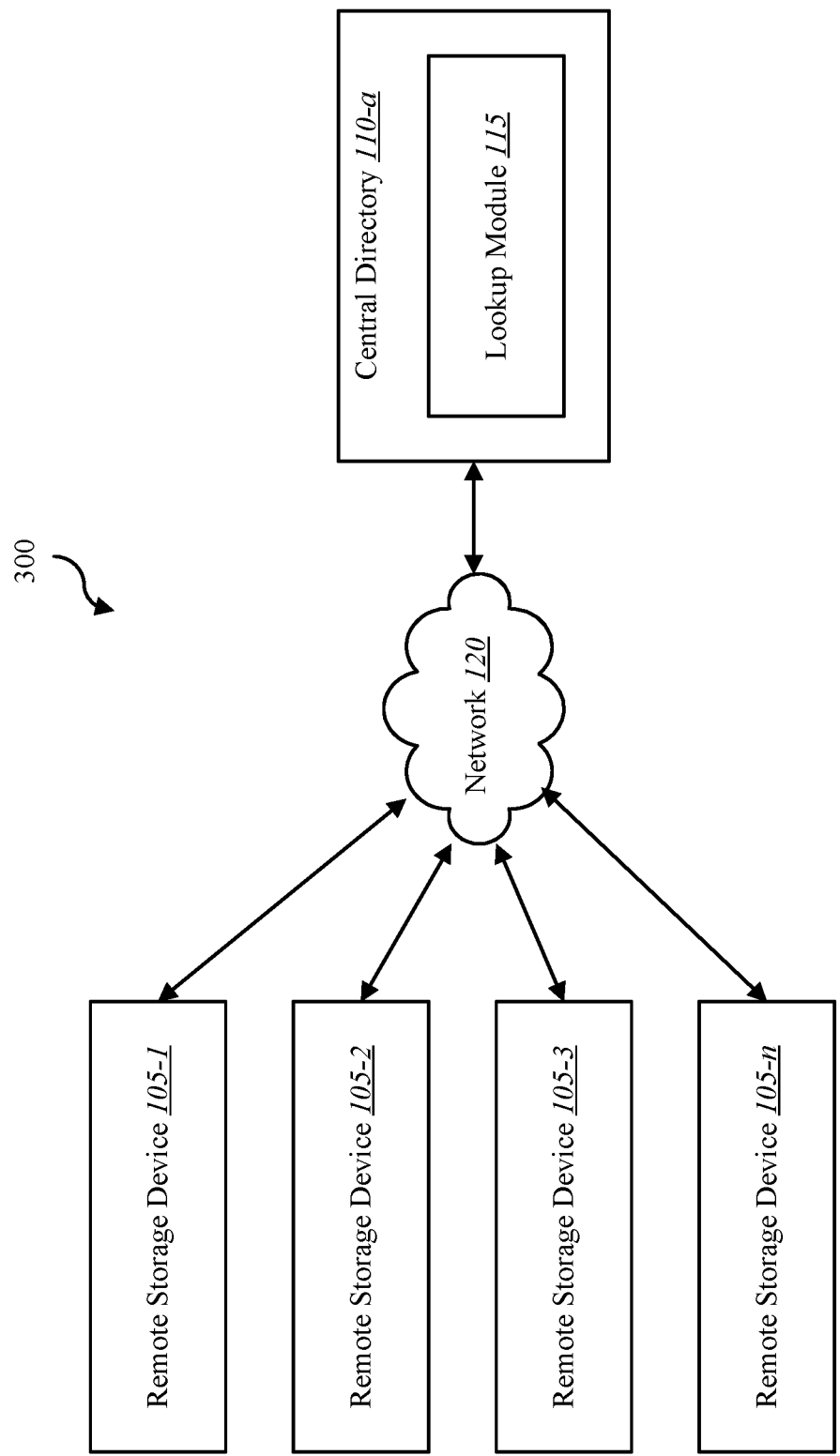
FIG. 3 is a block diagram of another environment in which the present systems and methods may be implemented.

FIG. 3 is a block diagram illustrating one embodiment of an environment 300 in which the present systems and methods may be implemented. Environment 300 may include at least some of the components of environments 100, 200 described above. Environment 300 may include a plurality of remote storage devices 105, a central directory 110-*a* that includes lookup module 115 or components thereof, and a network 120 that provides communication between remote storage device 105 and central directory 110-*a* and/or lookup module 115.

In some embodiments, central directory 110-*a* may (e.g., via lookup module 115) conduct the searching, communications, and other functions described above which were conducted at least in part via remote storage devices 105. Central directory 110-*a* may include other features and components such as, for example, a processor, controller or the like to assist in operating lookup module 115. Central directory 110-a, as discussed above, may be part of a home automation and security system, such as a backend server, central station, or other aspect of the home automation security system. Lookup module 115 may operate to provide logarithmic lookup functions for one or more of remote storage devices 105, or some other value such as, for example, an address for a file or data bit stored on one of the remote storage devices 105.

Figure 4:
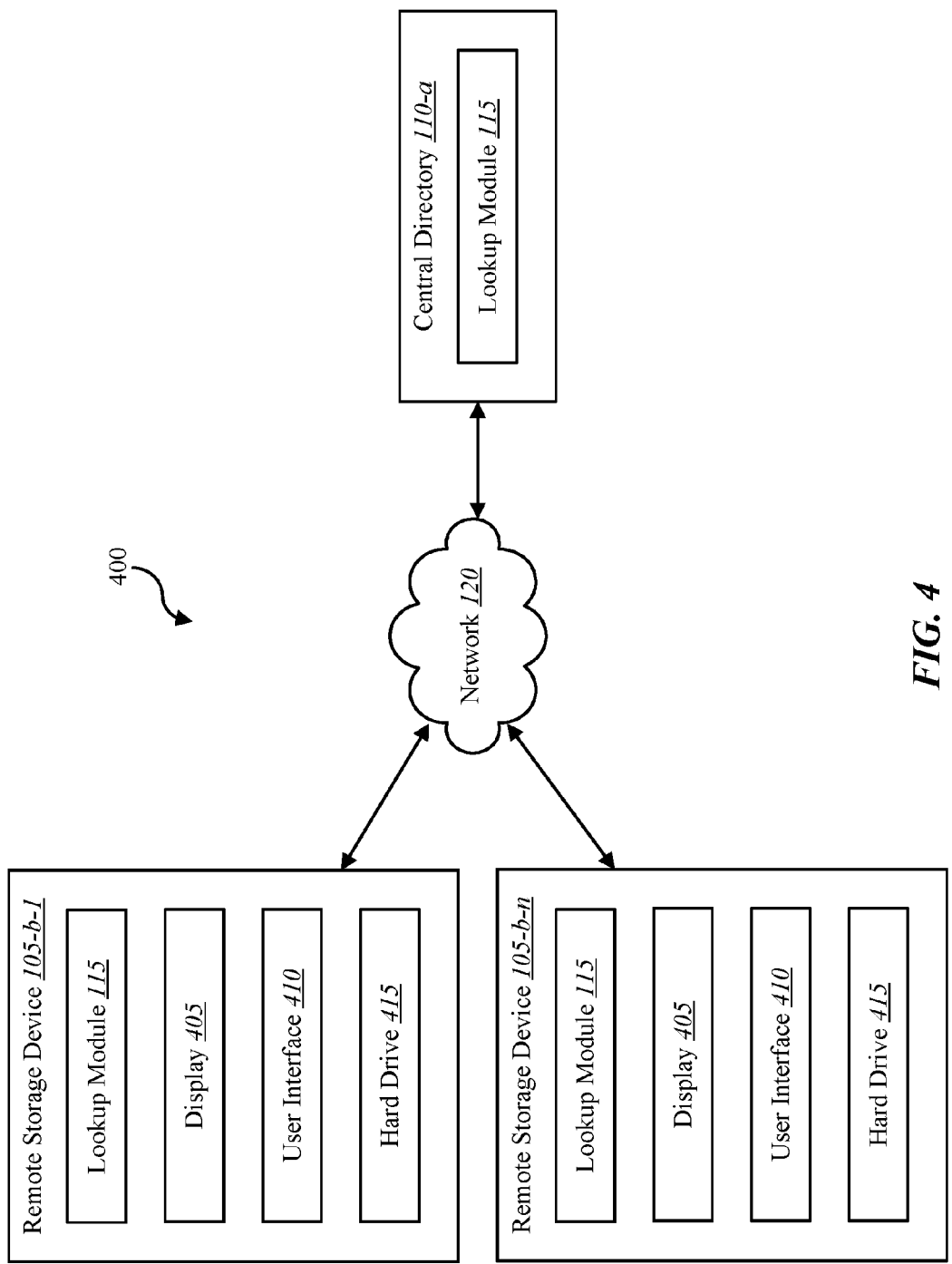
FIG. 4 is a block diagram of another environment in which the present systems and methods may be implemented.

FIG. 4 is a block diagram illustrating one embodiment of an environment 400 in which the present system and methods may be implemented. Environment 400 may include at least some of the of the components of environments 100, 200, 300 described above. Environment 400 include a plurality of remote storage devices 105-b, a central directory 110-a, and a lookup module 115. Lookup module 115, or components thereof, may be positioned or operable at least in part on each of remote storage devices 105-b and central directory 110-a. Network 120 may facilitate communication between the remote storage devices 105-b and central directory 110-a.

In addition to lookup module 115 or components thereof, remote storage devices 105-b may also include a display 405, a user interface 410, and a hard drive 415. Display 405 may be viewable on the remote storage device 105-b for a user to observe displayed information. Display 405 may include, for example, an LCD or LED screen or the like. Display 405 may be separate from user interface 410. User interface 410 may provide a way for the user to input information into remote storage device 105-b. In some examples, display 405 includes a touch screen, buttons, switches, or the like to provide user interface 410. In one example, a user may request via user interface 410, a data file such as, for example, a video file, picture file, or other media. Lookup module 115 may conduct a search for the requested data. Some of the requested data may be stored on remote storage device 105-b, such as on hard drive 415. Other of the data may be stored remotely, such as, for example, on another remote storage device 105.

Lookup module 115 may conduct a logarithmic lookup function to search for the requested data. Lookup module 115 may concurrently query central directory 110-a for the data. In some examples, lookup module 115 may know the name of a remote storage device 105-b on which the data stored (e.g., key), but does not have an address for the remote storage device 105-b (e.g., value). Central directory 110-a may provide the address (e.g., value) for the particular remote storage device 105-b, at which point the lookup module 115 may terminate the logarithmic lookup function. In other examples, central directory 110-a either does not include the requested address or has a delay in responding to the query for lookup module 115. The logarithmic lookup function may continue until the desired address is found, no more known closer addresses are returned as part of the search, or the central directory 110-a responds with the requested address.

The lookup module 115 may wait a predetermined time period before, for example, giving up on central directory 110-a being able to provide the requested information (e.g., address/value) after the initial query. The predetermined time period may be in the range, for example, 5 seconds to 5 minutes. In at least some examples, the logarithmic lookup function may temporarily be suspended while the query to central directory 110-a is conducted and a predetermined timeframe for receiving a response tolls.

Figure 5:
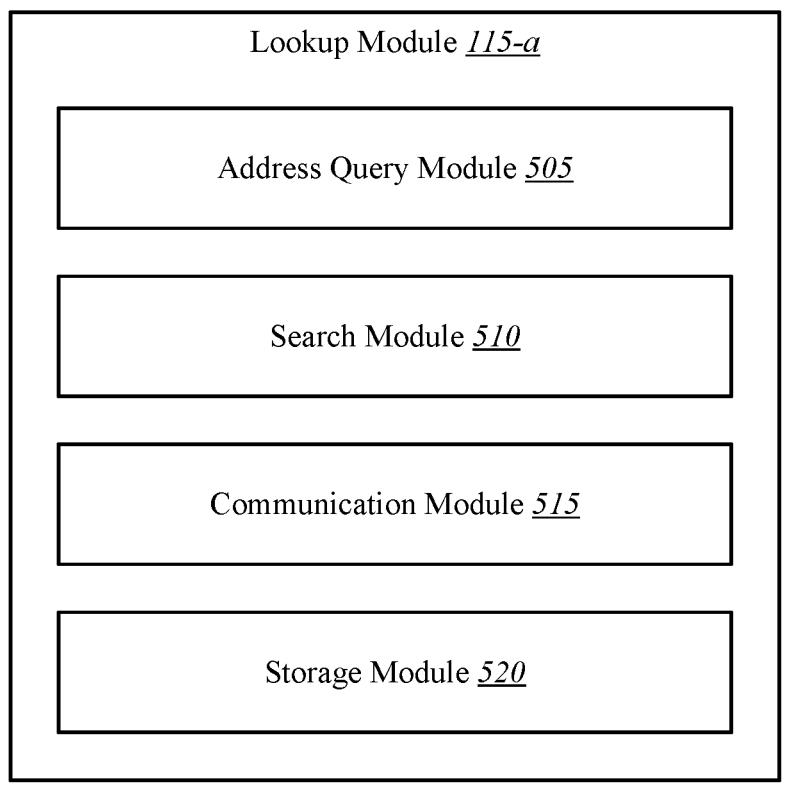
FIG. 5 is a block diagram of a lookup module of at least one of the environments shown in FIGS. 1-4.

FIG. 5 is a block diagram illustrating an example lookup module 115-a. Lookup module 115-a may be one example of the lookup module 115 described above with reference to FIGS. 1-4. Lookup module 115-a may include an address query module 505, a search module 510, a communication module 515, and a storage module 520. In other examples, a lookup module 115-a may include more or fewer modules than those shown in FIG. 5.

Address query module 505 may operate to query a central directory (e.g., central directory 110 described above as reference to FIGS. 1-4) for an address or other value. Search module 510 may operate to conduct a logarithmic search for the desired address or other value. The logarithmic search for the desired address may use an O (log n) lookup logic. The lookup operation may also be referred to as a successive lookup (e.g., iterative or recursive, and/or parallel or serial). The search operation may lookup a closest known address until no more known closer addresses are returned.

Communication module 515 may provide communication between one or more of the remote storage devices 105 and, for example, central directory 110 and/or other of the remote storage devices 105. Communication module 515 may deliver data or request data as part of the ongoing communications provided by lookup module 115-a. The communications facilitated by communication module 115 may be conducted via a network (e.g., network 120 described above as reference to FIGS. 1-4).

Storage module 520 may operate to store, for example, any of the communicated information provided via communication module 515, an address or other value provided in response to queries from address query module 505, and address or other data provided from a search conducted by search module 510 of other remote storage devices 105. Storage module 520 may control at least in part a hard drive or other storage feature of any one of the remote storage devices 105 in a given network such as the distributed remote storage device network that includes the remote storage devices 105 described herein.

Figure 6:
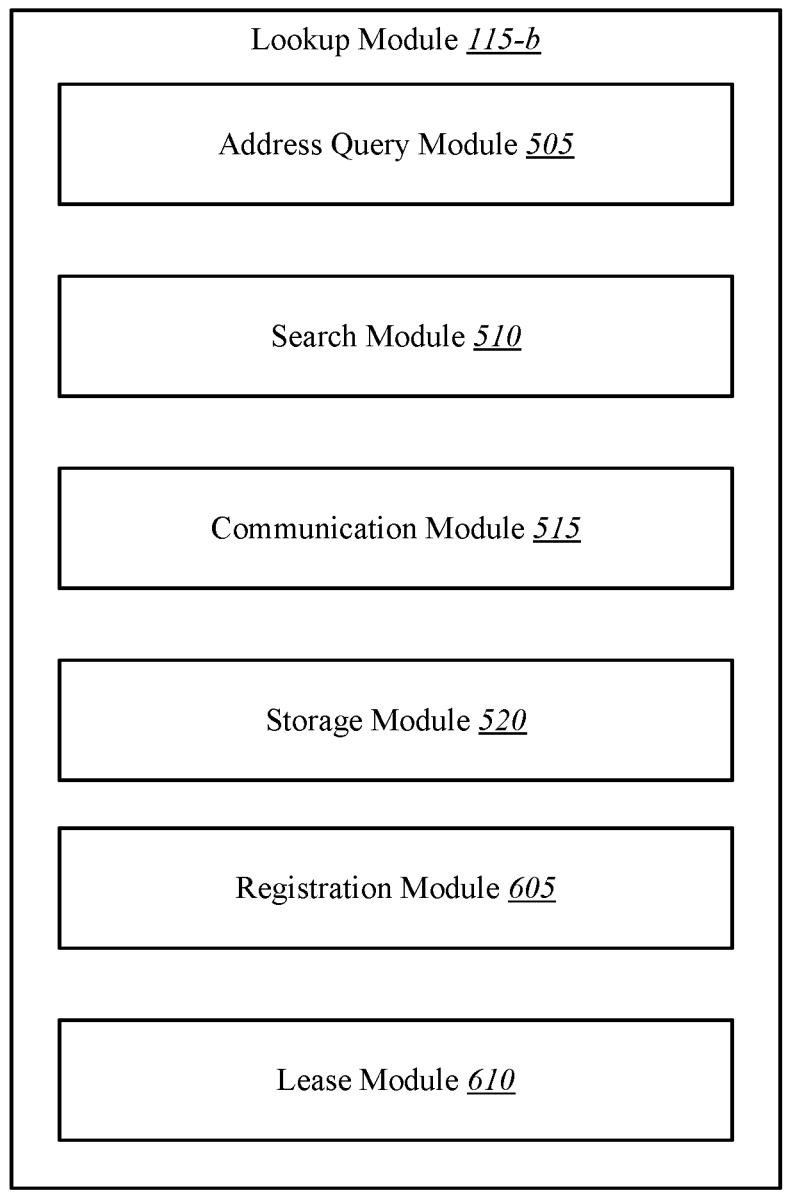
FIG. 6 is a block diagram of a lookup module of at least one of the environments shown in FIGS. 1-4.

FIG. 6 is a block diagram illustrating another example lookup module 115-b. Lookup module 115-b may be one example of the lookup module 115 described above with reference to FIGS. 1-4. Lookup module 115-b may include a registration module 605 and lease module 610 in addition to or in place of address query module 505, search module 510, communication module 515, and storage module 520.

Lookup module 115-b may operate at least in part to register, re-register, identify, or the like, any one of the remote storage devices 105, data stored on remote storage devices 105, and the like, in central directory 110. Registration module 605 may operate to register one or more of remote storage devices 105 with central directory 110. The registration process may include, for example, logging identification information and name of a remote storage device 105 in central directory 110. Registration module 605 may operate to register other information associated with remote storage device 105 such as, for example, physical location, e-mail address and/or unique identifier for the owner/user of remote storage device 105, owner name, date of activation, storage capacity, formatting information, and the like. In other examples, registration module 605 may register with central directory 110 information about the data stored on any one of remote storage devices 105 such as, for example, a file name, a file location, a relationship between data held on remote storage devices 105, and the like.

Lease module 610 may operate to send or receive lease information associated with the remote storage device 105. In one example, lease module 610 may generate lease terms and/or deliver lease terms associated with registration of a remote storage device 105 or data retained thereon. The lease data may include, for example, a lease term. Remote storage device 105 may save and/or calendar the lease term and automatically re-register remote storage device 105 at or close to the expiration of the lease term via registration module 605. The lease terms may include a requirement to periodically notify the central directory of the presence of remote storage device and/or other parameters such as, for example, a storage capacity, operational status, or the like, associated with any particular remote storage device 105.

Figure 7:
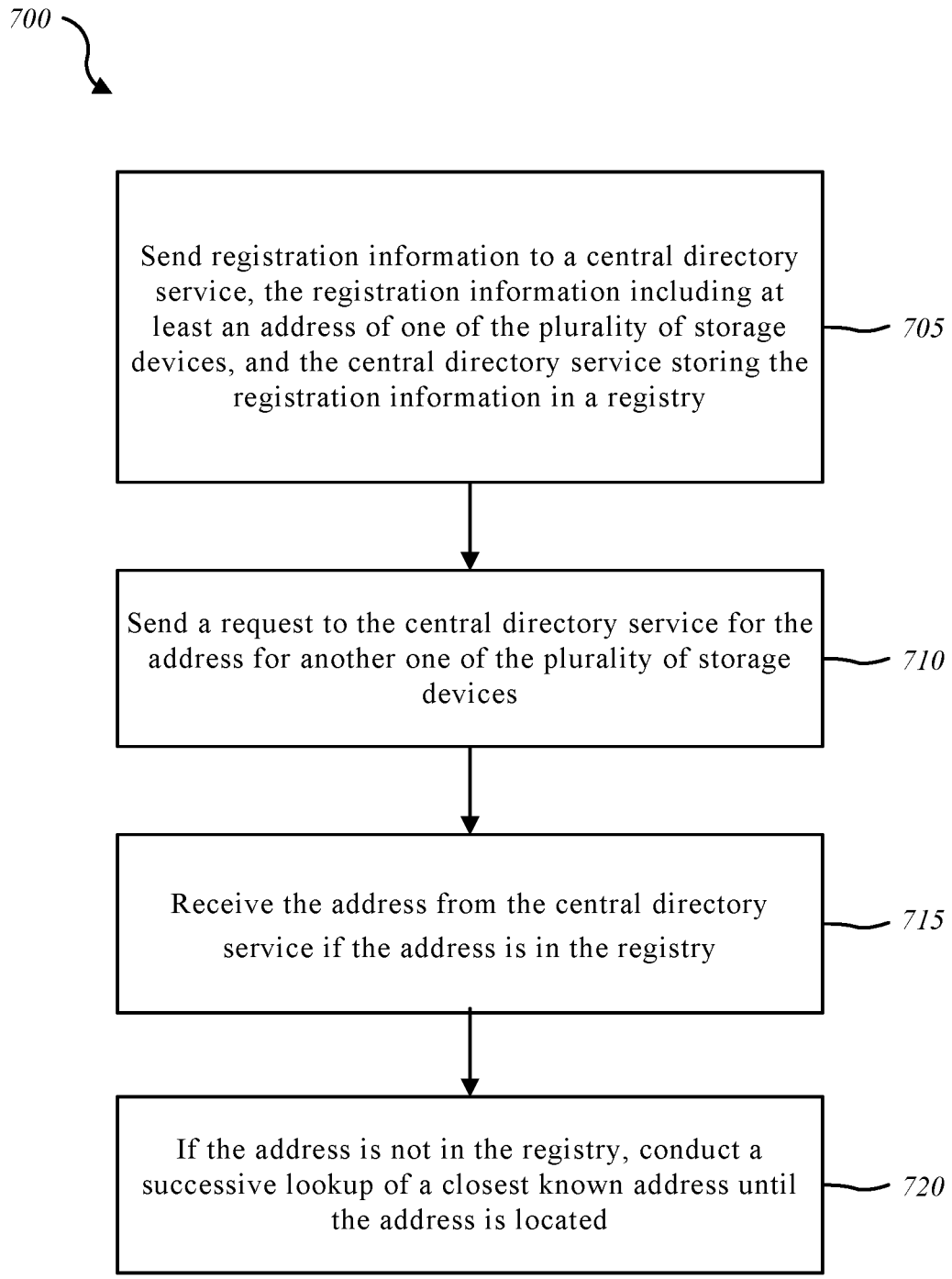
FIG. 7 is a flow diagram illustrating a method for locating a target storage device among a plurality of storage devices connected via a network.

FIG. 7 is a block diagram illustrating one embodiment of a method 700 for locating a target storage device among a plurality of storage devices connected via a network. In some configurations, the method 700 may be implemented by the lookup module 115 shown and described to reference FIGS. 1-6. In other examples, method 700 may be performed generally by remote storage device 105 and/or central directory 110 shown in FIGS. 1-4, or even more generally by the environments 100, 200, 300, 400 shown in FIGS. 1-4.

At block 705, method 700 includes sending registration information to a central directory service, the registration information including at least an address of one of the plurality of storage devices, and the central directory service storing the registration in a registry. Block 710 includes sending a request to the central directory service for an address for another one of the plurality of storage devices. Block 715 includes receiving the address from the central directory service if the address is in the registry. Block 720 includes connecting a successive lookup of a closest known address until the address is located if the address is not in the registry.

The method 700 may also include initiating the successive lookup before checking the central directory, and terminating the successive lookup if the central directory responds with the address. Method 700 may include communicating with the another one of the plurality of the storage devices using the address. Method 700 may include delivering data to the another one of the plurality of storage devices using the address, and the data is stored at the another one of the plurality of storage devices. The method 700 may include receiving from the central directory service lease terms, and sending registration information to the central directory service at an end of a lease based on the lease terms. The method 700 may also include sending registration information to a central directory each time one of the plurality of storage devices is connected to the network after having been disconnected from the network. The method 700 may include periodically communicating with the central directory service to confirm presence of at least one storage device in the network.

Figure 8:
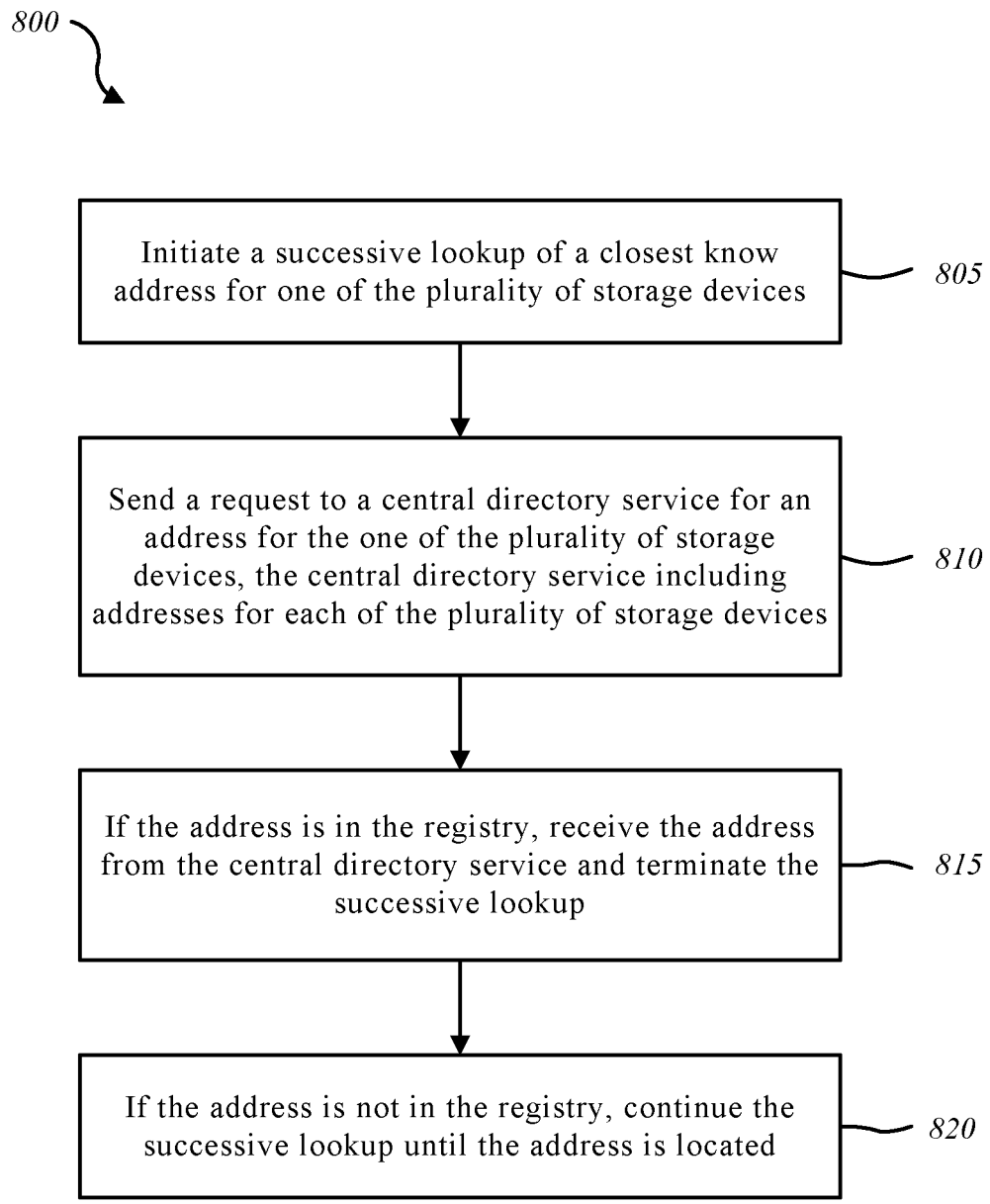
FIG. 8 is a flow diagram illustrating another method for locating a target storage device among a plurality of storage devices connected via a network.

FIG. 8 is a block diagram illustrating one embodiment of a method 800 for locating a target storage device among a plurality of storage devices connected via a network. In some configurations, the method 800 may be implemented by the lookup module 115 shown and described with reference to FIGS. 1-6. In one example, method 800 may be performed generally by remote storage device 105 and/or central directory 110 shown in FIGS. 1-4, or even more generally by the environments 100, 200, 300, 400 shown in FIGS. 1-4.

At block 805, the method 800 includes initiating a successive lookup of a closest known address for one of the plurality of storage devices. Block 810 includes sending a request to a central directory for an address for one of the plurality of storage devices, the central directory including addresses for each of the plurality of storage devices. At block 815, the method 800 includes receiving the address from the central directory and terminating the successive lookup if the address is in the central directory. Block 820 includes continuing the successive lookup until the address is located if the address is not in the central directory. Method 800 may also include delivering the data to one of the plurality of storage devices using the address, wherein the data is stored at one of the plurality of storage devices.

Figure 9:
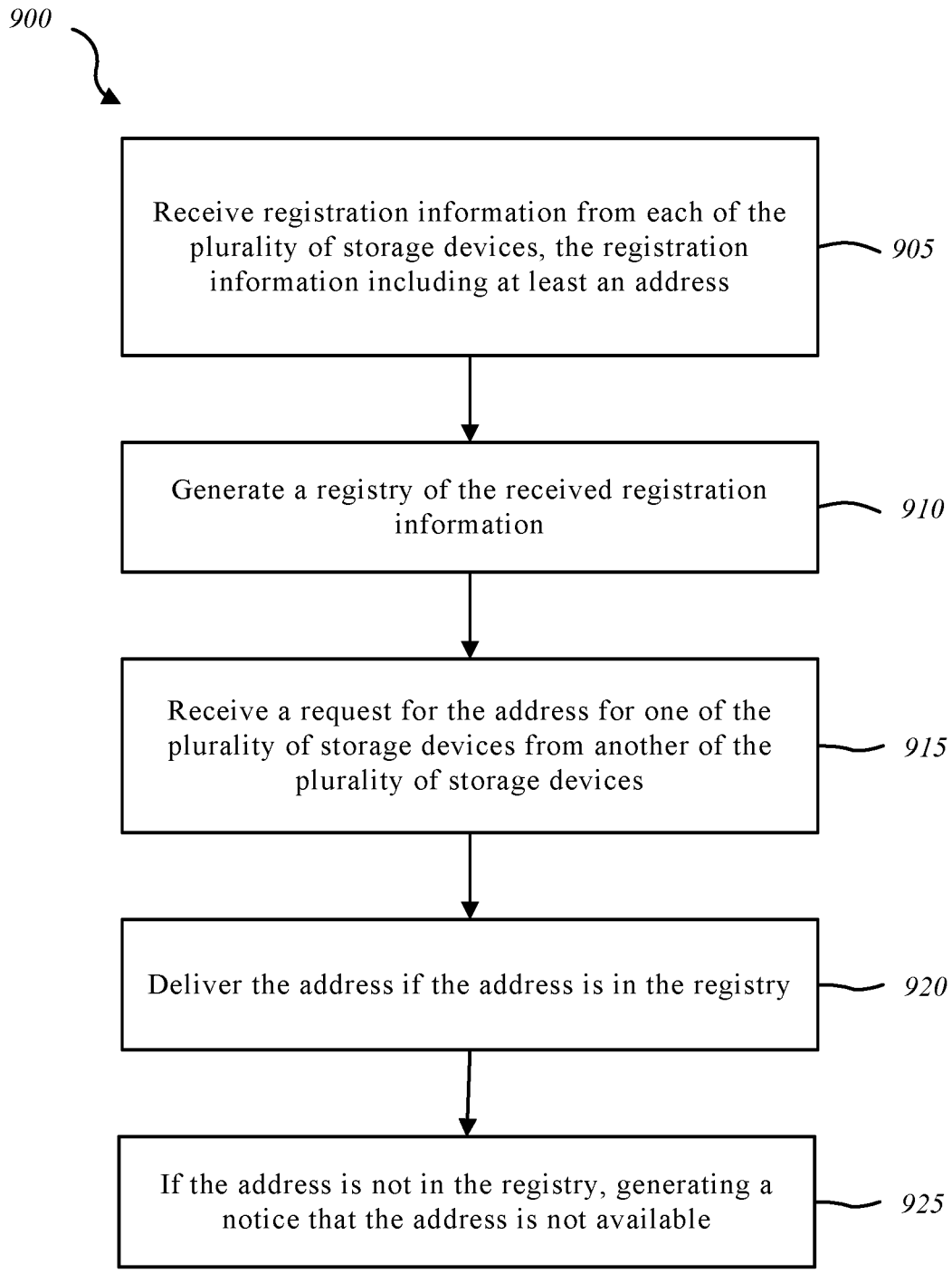
FIG. 9 is a flow diagram illustrating another method for locating a target storage device addresses among a plurality of storage devices in a network.

FIG. 9 is a block diagram illustrating one embodiment of a method 900 for locating a target storage device address among a plurality of storage devices in a network. The method 900 may, in some configurations, be implemented by the lookup module 115 shown and described with reference to FIGS. 1-6. In one example, method 900 may be performed generally by a remote storage device 105 and/or central directory 110 shown in FIGS. 1-4, or even more generally by the environments 100, 200, 300, 400 shown in FIGS. 1-4.

At block 905, method 900 includes receiving registration information from each of the plurality of storage devices, the registration information including at least an address. Block 910 includes generating a registry for the received registration information. Block 915 includes receiving a request for an address for one of the plurality of storage devices from another of the plurality of storage devices. Block 920 includes delivering the address if the address is in the registry. Block 925 includes generating a notice that the address is not available if the address is not in the registry.

Method 900 may also include receiving registration information from the plurality of storage devices upon the plurality of storage devices being added to or taken away from the network. The method 900 may include delivering lease information to each of the plurality of storage devices in response to receiving the registration information.

While the methods described with reference to FIGS. 7-9 focus on searching for, communicating, registering, and the like associated with an address for one or more storage devices, the same or similar methods may be implemented to search for, communicate, or register other types of information such as any "key" or "value" in a key value database, or other information available in other databases such as, for example, files, file names, file addresses, metadata, and the like. The systems and methods described herein are particularly relevant to distributed hash tables for use in a network of distributed remote storage devices.

Figure 10:
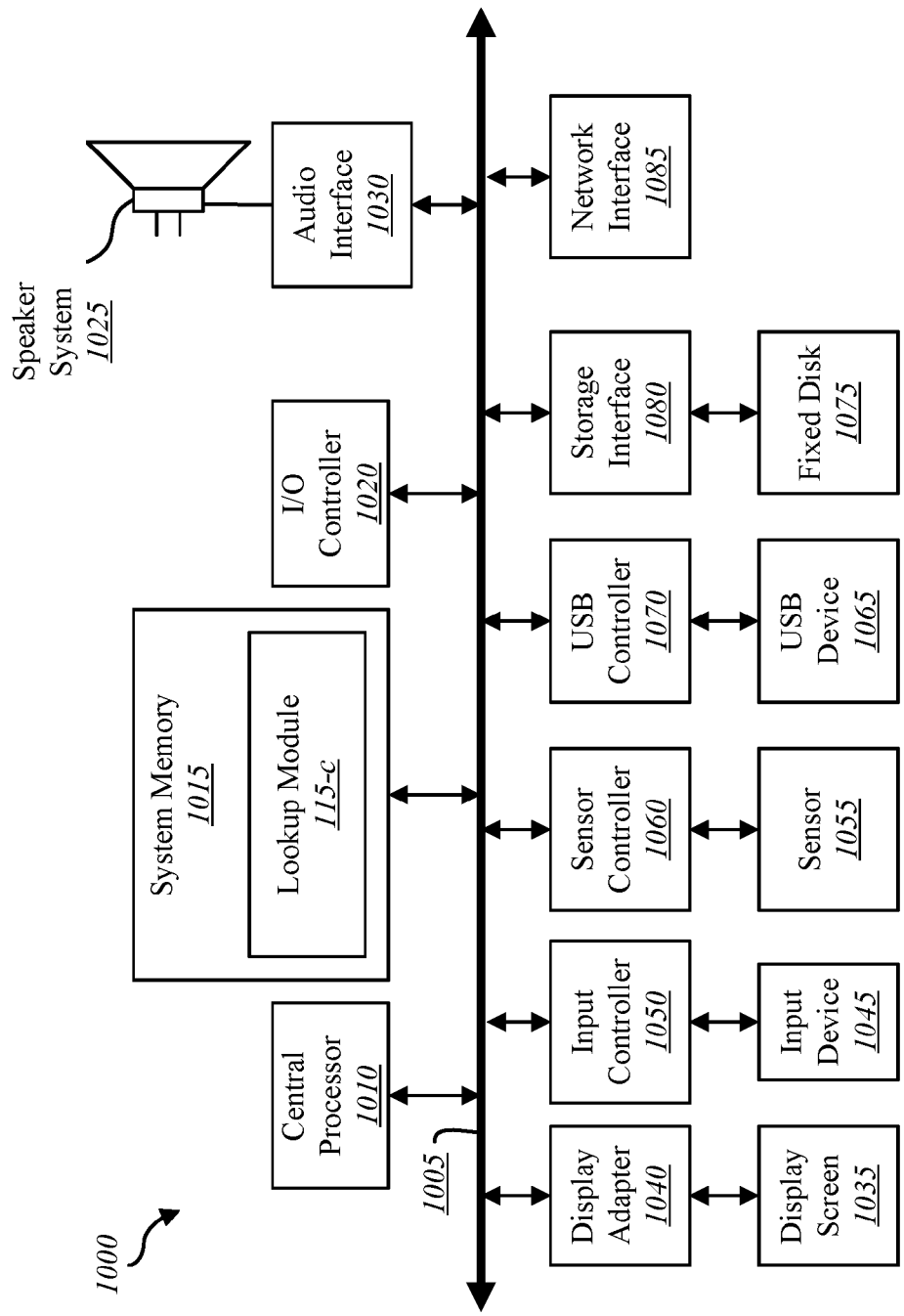
FIG. 10 is a block diagram of a computer system suitable for implementing the present systems and methods of FIGS. 1-9.

FIG. 10 depicts a block diagram of a controller 1000 suitable for implementing the present systems and methods. In one configuration, controller 1000 includes a bus 1005 which interconnects major subsystems of controller 1000, such as a central processor 1010, a system memory 1015 (typically RAM, but which may also include ROM, flash RAM, or the like), an input/output controller 1020, an external audio device, such as a speaker system 1025 via an audio output interface 1030, an external device, such as a display screen 1035 via display adapter 1040, an input device 1045 (e.g., remote control device interfaced with an input controller 1050), multiple USB devices 1065 (interfaced with a USB controller 1070), and a storage interface 1080. Also included are at least one sensor 1055 connected to bus 1005 through a sensor controller 1060 and a network interface 1085 (coupled directly to bus 1005).

Bus 1005 allows data communication between central processor 1010 and system memory 1015, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the lookup module 115-*c* to implement the present systems and methods may be stored within the system memory 1015. Applications resident with controller 1000 are generally stored on and accessed via a non-transitory computer readable medium, such as a hard disk drive (e.g., fixed disk drive 1075) or other storage medium. Additionally, applications can be in the form of electronic signals modulated in accordance with the application and data communication technology when accessed via network interface 1085.

Storage interface 1080, as with the other storage interfaces of controller 1000, can connect to a standard computer readable medium for storage and/or retrieval of information, such as a fixed disk drive 1075. Fixed disk drive 1075 may be a part of controller 1000 or may be separate and accessed through other interface systems. Network interface 1085 may provide a direct connection to a remote server via a direct network link to the Internet via a POP (point of presence). Network interface 1085 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 1000 wirelessly via network interface 1085.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 10 need not be present to practice the present systems and methods. The devices and subsystems can be interconnected in different ways from that shown in FIG. 10. The aspect of some operations of a system such as that shown in FIG. 10 are readily known in the art and are not discussed in detail in this application. Code to implement the present disclosure can be stored in a non-transitory computer-readable medium such as one or more of system memory 1015 or fixed disk drive 1075. The operating system provided on controller 1000 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A hybrid distributed hash table (DHT) system, comprising:
    a network;
    a plurality of storage devices;
    a central directory in communication with the plurality of storage devices via the network, the central directory configured to receive registration information separately from each of the plurality of storage devices and store the registration information in a registry;
    wherein a lookup function is performed by a first storage device included in the plurality of storage devices, the lookup function including initiating a central directory query by checking the central directory for an address of a second storage device included in the plurality of storage devices, while concurrently initiating a logarithmic query on the central directory by conducting a successive lookup for closest known addresses, and terminating the logarithmic query when a closest known address identified in an iteration of the logarithmic query is same as a closest known address identified in a subsequent iteration of the logarithmic query; and a database configured to store a plurality of keys searchable in the lookup function.

2. The hybrid DHT system of claim 1, wherein the central directory is further configured to maintain the registry of the plurality of storage devices.

3. The hybrid DHT system of claim 1, wherein the lookup function is further includes conducting the successive lookup of a closest known address for at least one of the plurality of storage devices until the address is located.

4. The hybrid DHT system of claim 3, wherein the successive lookup is conducted until the address is located if the central directory does not respond with the address within a predetermined time period.

5. The hybrid DHT system of claim 3, wherein the successive lookup is initiated if the central directory responds that the address is not in the registry.

6. The hybrid DHT system of claim 3, wherein the successive lookup is initiated if the central directory does not respond within the predetermined time period.

7. The hybrid DHT system of claim 3, wherein the successive lookup is initiated prior to checking the central directory.

8. The hybrid DHT system of claim 3, wherein the successive lookup includes a O(log n) lookup logic.

9. The hybrid DHT system of claim 1, wherein the lookup function includes a key value search, and the address is one of the plurality of keys stored in the database.

10. The hybrid DHT system of claim 9, wherein the plurality of keys are searchable in the key value search.

11. The hybrid DHT system of claim 9, wherein a unique node identifier is an additional key of the plurality of keys searchable in the key value search.

12. The hybrid DHT system of claim 9, wherein a physical address is an additional key of the plurality of keys searchable in the key value search.

13. The hybrid DHT system of claim 1, wherein the at least one of the plurality of storage devices is configured to communicate with another of the plurality of storage devices using the address.

* * * * *